(12) United States Patent
Bischoff

(10) Patent No.: US 12,045,434 B2
(45) Date of Patent: Jul. 23, 2024

(54) INTEGRATED METHOD AND SYSTEM FOR CREATION OF A DIAGRAM COMPILATION BOOK AND EXPORTING THE BOOK FOR USE AS CONTENT IN A VISUAL PRESENTATION TOOL

(71) Applicant: Pro Quick Draw LLC, St. Paul, MN (US)

(72) Inventor: Andrew Erich Bischoff, Baltimore, MD (US)

(73) Assignee: Pro Quick Draw LLC, St. Paul, MN (US)

( * ) Notice: Subject to any disclaimer, the term of this patent is extended or adjusted under 35 U.S.C. 154(b) by 0 days.

(21) Appl. No.: 17/723,294

(22) Filed: Apr. 18, 2022

(65) Prior Publication Data
US 2023/0043720 A1     Feb. 9, 2023

Related U.S. Application Data

(63) Continuation of application No. 16/793,594, filed on Feb. 18, 2020, now Pat. No. 11,307,732.

(60) Provisional application No. 62/807,105, filed on Feb. 18, 2019.

(51) Int. Cl.
*G06F 3/04817*     (2022.01)
*G06F 3/0482*     (2013.01)
*G09B 19/00*     (2006.01)

(52) U.S. Cl.
CPC ........ *G06F 3/04817* (2013.01); *G06F 3/0482* (2013.01); *G09B 19/0038* (2013.01)

(58) Field of Classification Search
CPC ............... G06F 3/04817; G06F 3/0482; G09B 19/0038
See application file for complete search history.

(56) References Cited

U.S. PATENT DOCUMENTS

| | | | | |
|---|---|---|---|---|
| 6,202,061 | B1* | 3/2001 | Khosla | G06F 16/58 |
| | | | | 707/999.005 |
| 7,139,095 | B1* | 11/2006 | Hunter | G06K 15/02 |
| | | | | 358/1.6 |
| 2004/0057064 | A1 | 3/2004 | Stringham | |
| 2008/0288590 | A1 | 11/2008 | Lynch | |
| 2012/0110439 | A1* | 5/2012 | Rosner | G06F 40/10 |
| | | | | 715/246 |
| 2012/0154608 | A1 | 6/2012 | Ko | |
| 2013/0316837 | A1 | 11/2013 | Coiner, Jr. | |
| 2013/0346874 | A1* | 12/2013 | Wallace | G06F 16/93 |
| | | | | 715/744 |
| 2016/0193530 | A1 | 7/2016 | Parker | |
| 2018/0005544 | A1* | 1/2018 | Molenje | G09B 19/0038 |
| 2018/0129634 | A1 | 5/2018 | Sivaji | |

(Continued)

OTHER PUBLICATIONS

Oct. 28, 2020 USPTO Office Action (U.S. Appl. No. 16/793,594).
Jun. 10, 2021 USPTO Office Action (U.S. Appl. No. 16/793,594).

*Primary Examiner* — Andrew T Chiusano
(74) *Attorney, Agent, or Firm* — Forsgren Fisher; Daniel A. Tysver; James M. Urzedowski (57) ABSTRACT

A system and method for providing integrated play diagram compilation visualization and assembly that includes a visual graphic diagramming tool having a visual workspace for creating play diagrams and an add-on play diagram compilation tool that provides a graphical user interface in combination with the visual workspace of the visual graphic diagramming tool.

18 Claims, 10 Drawing Sheets

(56) References Cited

U.S. PATENT DOCUMENTS

2019/0163970 A1 5/2019 Yu
2021/0354017 A1 11/2021 Friehauf

* cited by examiner

INTEGRATED METHOD AND SYSTEM FOR CREATION OF A DIAGRAM COMPILATION BOOK AND EXPORTING THE BOOK FOR USE AS CONTENT IN A VISUAL PRESENTATION TOOL

BACKGROUND

Sports teams participating in collaborative team sports typically practice and run set offensive and/or defensive plays and/or set offensive and/or defensive formations in which each team member on the field has a defined role. This is particularly ubiquitous in the collaborative team sports of American football and basketball.

Coaches typically prepare diagrams of formations and/or plays, and hold team meetings in which these diagrams are visually presented and discussed with the team, who are then expected to study the plays and formations so that they know and understand their particular role for each play and/or formation by name. Teams with a compensated coaching staff often prepare these diagrams using a visual graphic diagraming tool such as Microsoft's Visio or Power Point programs.

Professional, semi-professional and university sports teams participating in collaborative team sports typically have an electronic collection of play and formation diagrams that may include hundreds or even thousands of diagrams. Preparation of a game plan playbook from this collection is a time and labor intensive endeavor, requiring selection of the plays to be included, locating the play diagrams for the selected plays in the electronic collection, customizing the play diagram for certain plays based upon the opponent, and then assembly of these play diagrams into game plan book that often requires not only cutting and pasting but reformatting, resizing and re-editing of the diagrams.

Hence, a longstanding need exists for a method and a system that can facilitate the preparation of game plan playbooks and display of the playbook content in a formal presentation including the means to take the collection of play diagrams and create a more user friendly library system.

SUMMARY OF THE INVENTION

A method for providing integrated play diagram compilation visualization and assembly for simplifying and accelerating the creation of play diagram compilations such as a game plan playbook from individual play diagrams. The method includes the steps of (i) opening a visual graphic diagramming tool having a visual workspace for creating play diagrams, (ii) opening an add-on play diagram compilation tool to provide a graphical user interface in combination with the visual workspace of the visual graphic diagramming tool, the graphical user interface including icons used to perform certain page layout and diagram compilation functions and at least one document file picklist containing a list of electronic files each containing a single play diagram created using the visual graphic diagramming tool, (iii) applying a page layout template having at least one tile per page to the page of an active document displayed in the visual workspace, (iv) selectively inserting the play diagram content of an electronic file listed in the picklist into an assigned tile in the active document by selecting the electronic file from the picklist, and repeating step (iv) by selecting a different electronic file listed in the picklist for insertion into a different assigned tile in the document to create a game plan playbook containing a compilation of play diagrams. Insertion of a play diagram into a tile does not require opening of the electronic file prior to insertion.

A system for providing integrated visualization and assembly of a game plan playbook containing a compilation of electronic play diagrams. The system including (a) a visual graphic diagramming tool having a visual workspace for creating play diagrams in an active document, (b) a main library of electronic files in computer memory, each having a file name and containing a play diagram created with the visual graphic diagraming tool, and (c) a play diagram compilation tool, operatively coupled to the visual graphic diagraming tool to provide a graphical user interface having icons used to perform certain page layout and diagram compilation functions and at least one document file picklist, which displays with the visual workspace of the visual graphic diagramming tool, wherein the layout and diagram compilation functions include (i) display of a listing of electronic files copied from the main collection of electronic files to provide a working library of electronic files, (ii) display of a listing of page layout templates each having at least one tile per page for selective application to the page of an active document displayed in the visual workspace, (iii) selective insertion of the play diagram content of different electronic files listed in the picklist into each of a plurality of assigned tiles in the active document by selecting the electronic files from the library picklist to create a game plan playbook, and (iv) exporting the game plan playbook to a presentation program for use as content in a presentation. The system inserts a play diagram into a tile without requiring a user to first open the electronic file.

DETAILED DESCRIPTION OF A PREFERRED EMBODIMENT

Definitions

As utilized herein, including the claims, the phrase "collaborative team sport" refers to sports in which a team of more than two play together on a field during a competition and collaboration between team members improves the chances of success. Collaborative team sports include specifically but not exclusively football, soccer, lacrosse, rugby, basketball, volleyball, water polo, hockey, and polo.

As utilized herein, including the claims, the term "field" is used inclusively to encompass any bounded area upon which sports teams compete in a collaborative team sport, including specifically but not exclusively football fields, football arenas, soccer fields, lacrosse fields, rugby fields, basketball courts, volleyball courts, water polo pools, hockey rinks, and polo fields.

As utilized herein, including the claims, the phrase "game plan playbook" means a visual assemblage of play and/or formation diagrams selected from a library of such diagrams which may be run by a sports team during a given season or individual game.

As utilized herein, including the claims, the phrase "play diagram" means a diagram of a sports play and/or formation. Typically, a play diagram of a sports play will include an indication of the positioning of each team member on the field relative to other team members, and the path to be traveled by each team member including an indication of the shape and distance of this path relative to markings or distances on the field.

As utilized herein, including the claims, the term "tile" means a box or grouped set of boxes on a page layout template for displaying related information and images, such as a diagram, a description or title of the diagram and a sequential reference number for the diagram.

As utilized herein, including the claims, the phrase "unoccupied tile" means a tile containing no content for display in the tile, wherein the content may be a diagram or indicia indicating that the tile is empty.

Nomenclature Table

| REF. NO. | DESCRIPTION |
| --- | --- |
| 10 | Dashboard or Graphical User Interface of a Visual Graphic Diagramming Tool |
| 15 | Visual Workspace or Document Display |
| 20 | Dashboard or Graphical User Interface of a Play Diagram Compilation Tool |
| 21 | Ribbon of a Graphical User Interface of a Play Diagram Compilation Tool |
| 24 | Folder Picklist on a Graphical User Interface of a Play Diagram Compilation Tool |

Nomenclature Table
-continued

| REF. NO. | DESCRIPTION |
| --- | --- |
| 25 | Document File Library Picklist on a Graphical User Interface of a Play Diagram Compilation Tool ('Plays' Picklist) |
| 26 | File Names |
| 100 | Page Layout Template |
| 102 | Page Layout Template Designs |
| 104 | Tile |
| 106 | Tile Number |
| 200 | Play Diagram |
| 201 | Title |

Description

The system and method integrate the functionality of a visual graphic diagramming tool and a diagram compilation tool for greatly simplifying the assembly and editing of an electronic diagram compilation book such as a game plan playbook.

For convenience only, the detailed description shall be based upon use of a particular embodiment that employs Microsoft's Visio program as the visual graphic diagramming tool and a particular implementation of an add-on play diagram compilation tool designated Pro Quick Draw (PQD). The invention shall not be unduly limited to these particular embodiments as the invention can employ other visual graphic diagramming tools such as Microsoft's Power Point and other embodiments of a play diagram compilation tool.

Figure 1:
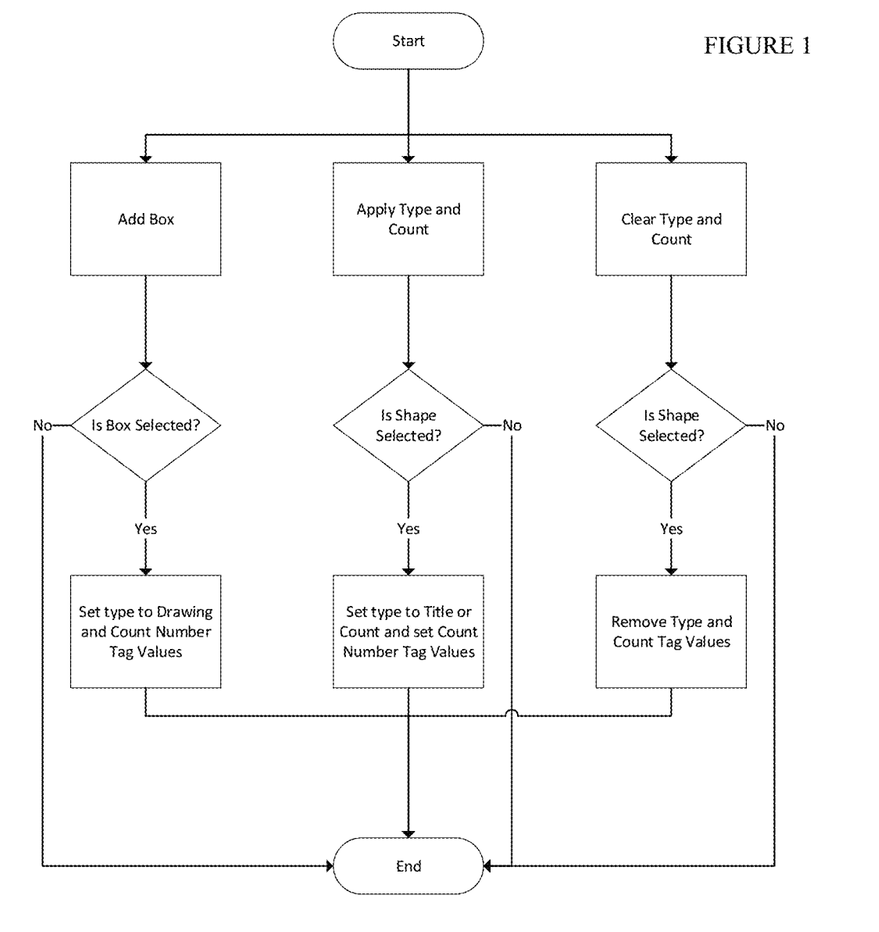
FIG. 1 is a flow diagram for one embodiment of the page layout template editor feature of the invention for creating or modifying a page layout template for application to pages of an active document.
Figure 2:
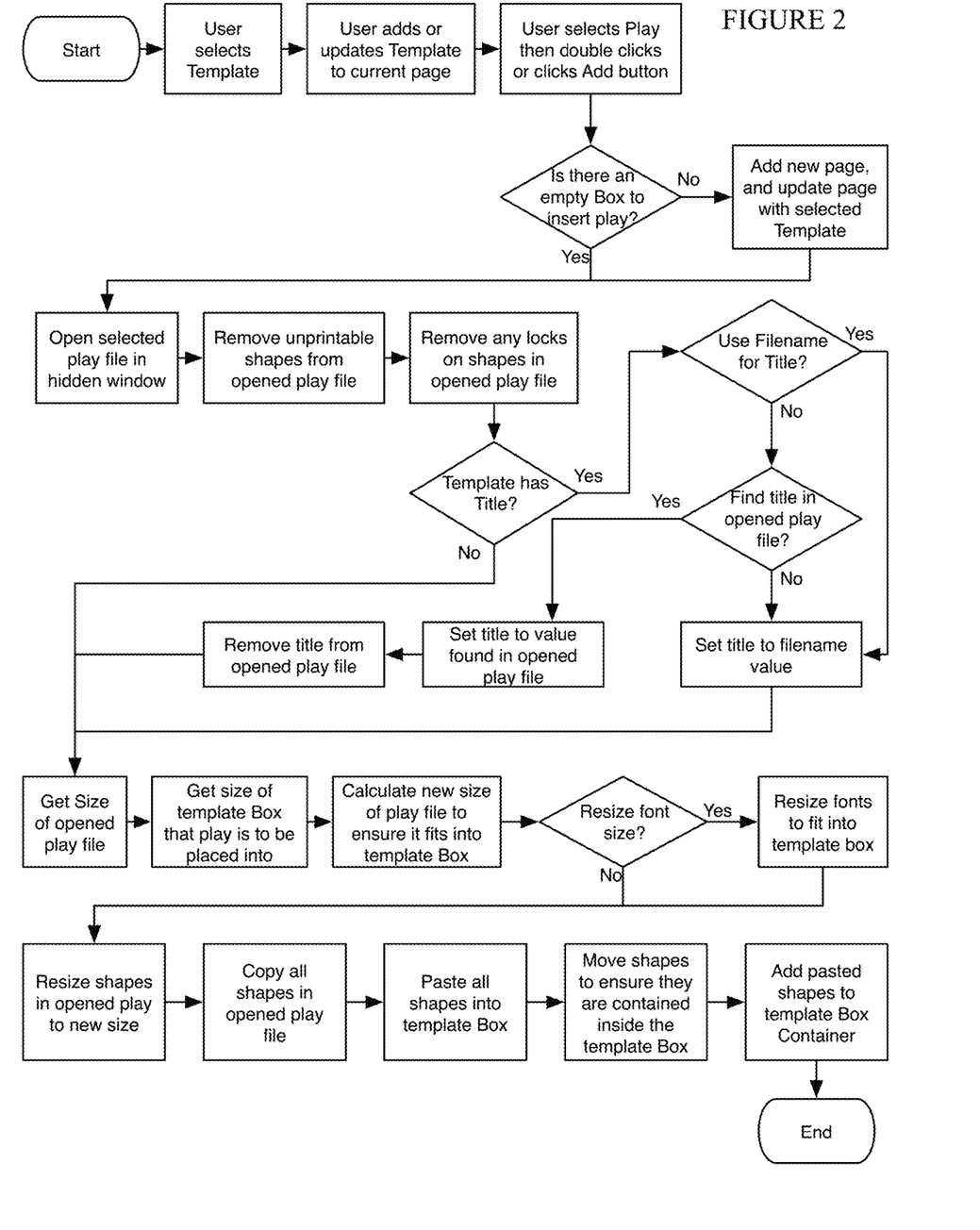
FIG. 2 is a flow diagram for one embodiment of the add play feature of the invention for inserting the play diagram content and title of an electronic file into an assigned tile in an active document and numbering the tile.
Figure 3:
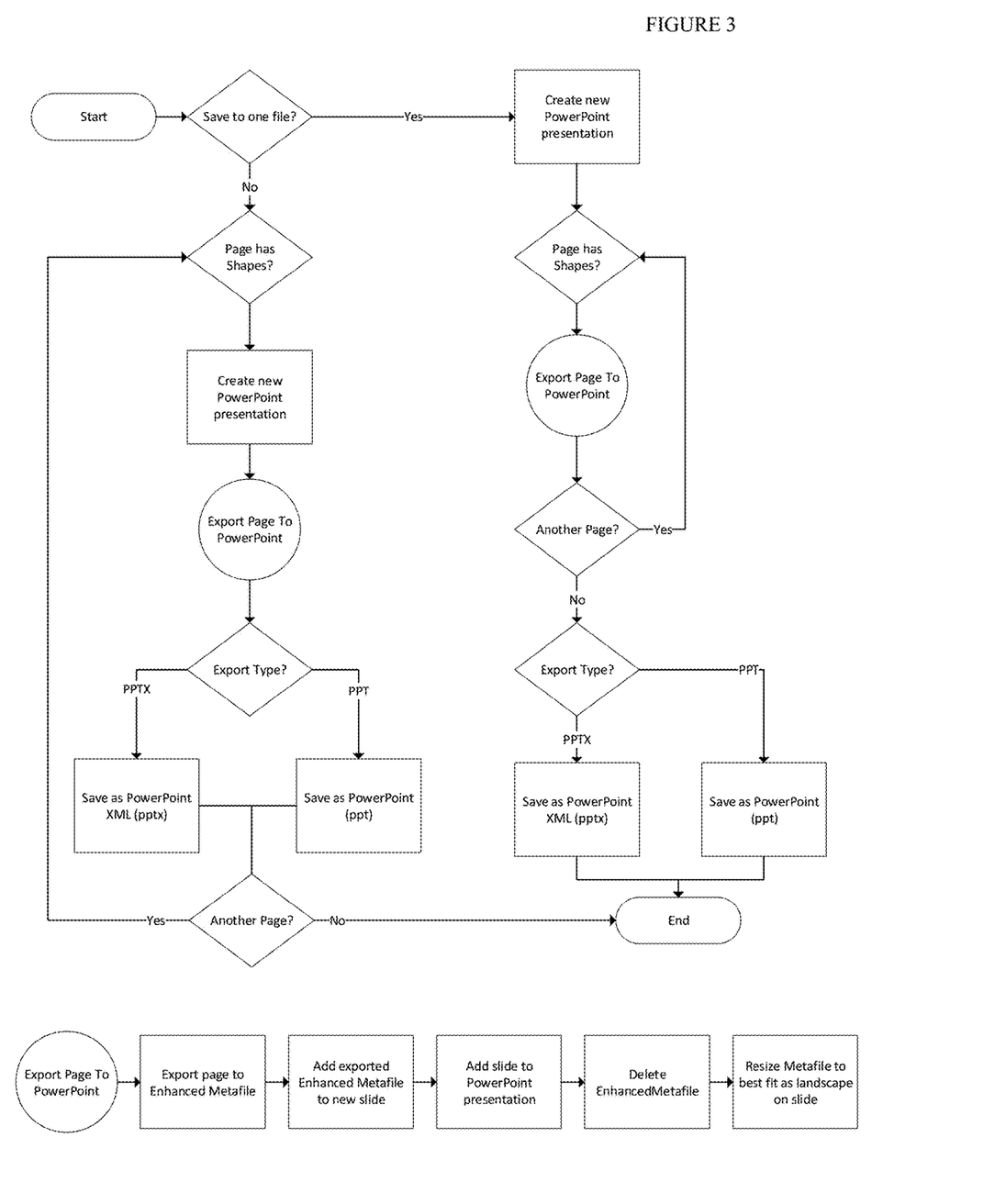
FIG. 3 is a flow diagram for one embodiment of the export feature of the invention for exporting a game plan playbook compiled in accordance with the invention from Visio files to a saved document in Power Point for use as content in a presentation or video file.
Figure 4:
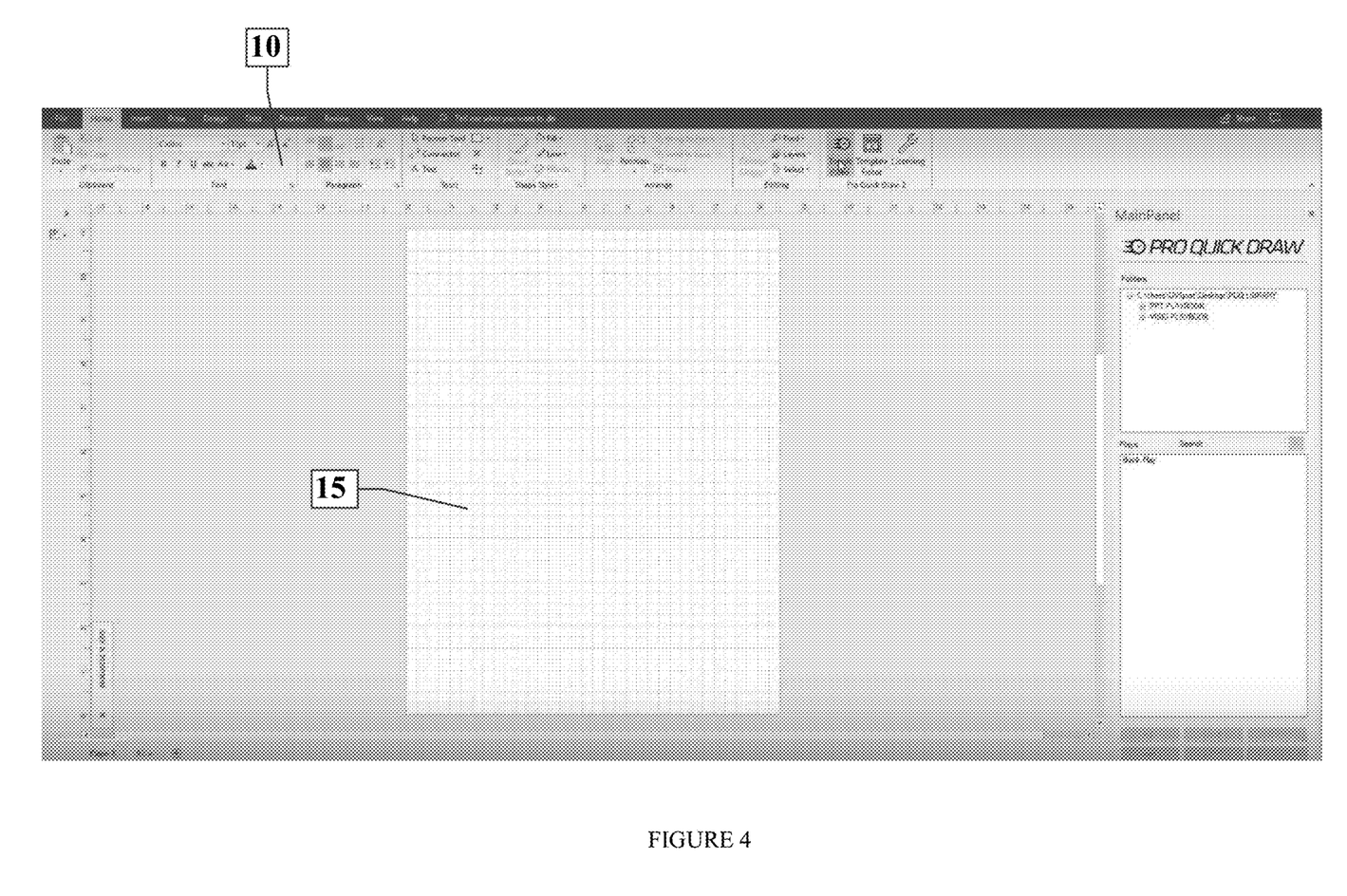
FIG. 4 is an illustration of one embodiment of a graphic user interface screen display of a visual graphic diagramming tool enhanced with one embodiment of an add-on play diagram compilation tool, with a display of an empty page in the visual workspace/document window.
Figure 5:
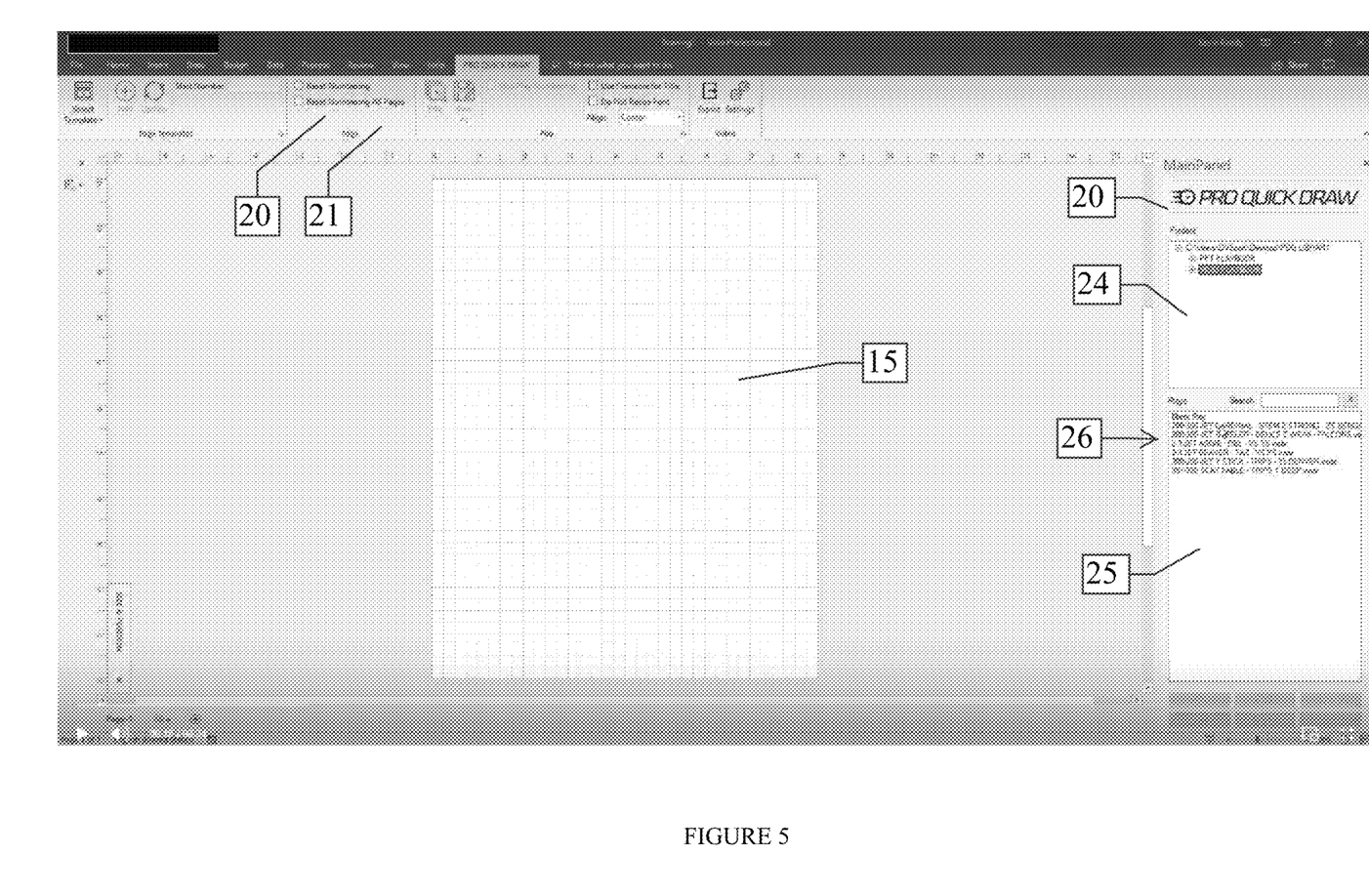
FIG. 5 is an illustration of the diagram compilation tool graphic user interface screen display displayed along with a visual workspace/document window.

The system is a Visio visual graphic diagramming tool enhanced with an add-on PQD play diagram compilation tool. Referring to FIG. 4, opening Visio displays the Visio graphical user interface 10 which includes a ribbon display atop an active blank drawing page in the visual workspace document display 15 of Visio. This ribbon display includes a PQD login section. Referring to FIG. 5, selection of the 'Toggle Panel' icon in the PQD login section of the ribbon displays a PQD graphical user interface 20 that includes a ribbon display atop the visual workspace document display 15 and a 'Main Panel' display to the side of the visual workspace document display containing a picklist 24 for entry of file folders under the heading 'Folders' and a searchable picklist 25 for display of files within a selected folder under the heading 'Plays'. For use in the system, each file listed in the 'Plays' picklist 25 should contain a single .vsdx play diagram 200 created with Visio.

Play files suitable for use in creating a game plan playbook should contain only a single play diagram 200 created with Visio. When a Visio play file contains more than one play diagram 200 the requirement for a single play diagram 200 per file may be achieved by cutting or copying and pasting each individual play diagram 200 from the play file into a play file and then these play files, each containing a single play diagram 200, saved in computer memory. This can be done completely within Visio and produces an original library of single-play play files.

Referring to FIG. 5, files from an original library of single-play play files may be imported into PQD for display in the 'Plays' library picklist 25 by selection of the small square icon in the lower right corner of the 'Play' section of the PQD ribbon on the PQD graphic user interface 20. Selection of this icon displays a desktop from which you can locate the original collection of single-drawing play files.

Folders containing single-drawing play files and individual single-drawing play files in the original collection can be imported into PQD for creation of a working library by simply selecting the folder or file in the original collection and clicking OK. The names of the imported folders and files will display in the appropriate 'Folder' 24 or 'Play' 25 picklist on the PQD screen and make them available for use from the PQD screen.

Figure 8:
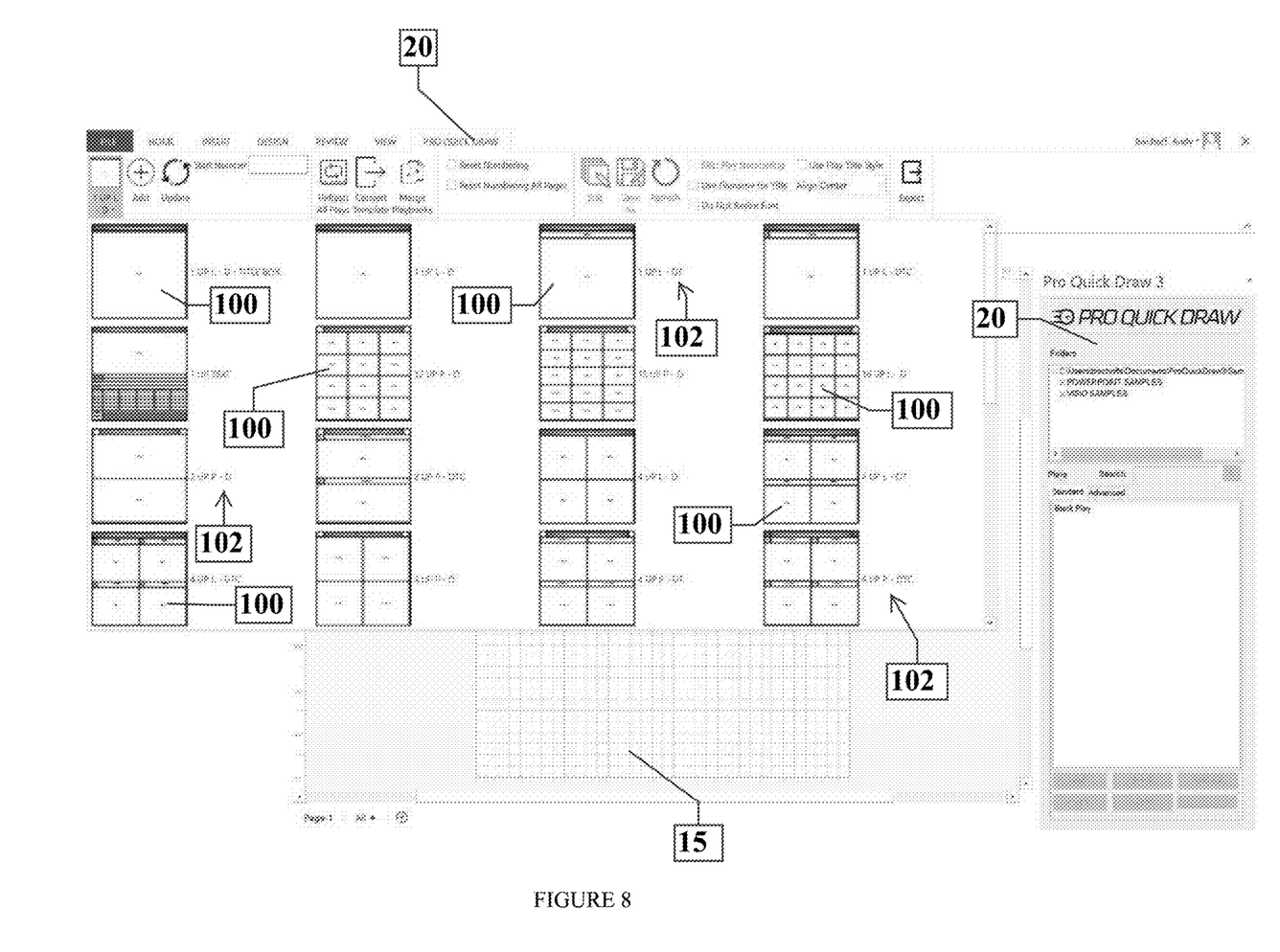
FIG. 8 is an illustration of one embodiment of a graphic user interface screen display of a play diagram compilation tool having an open drop down window depicting various page layout template options available for application to the page displayed in the visual workspace/document window.
Figure 9:
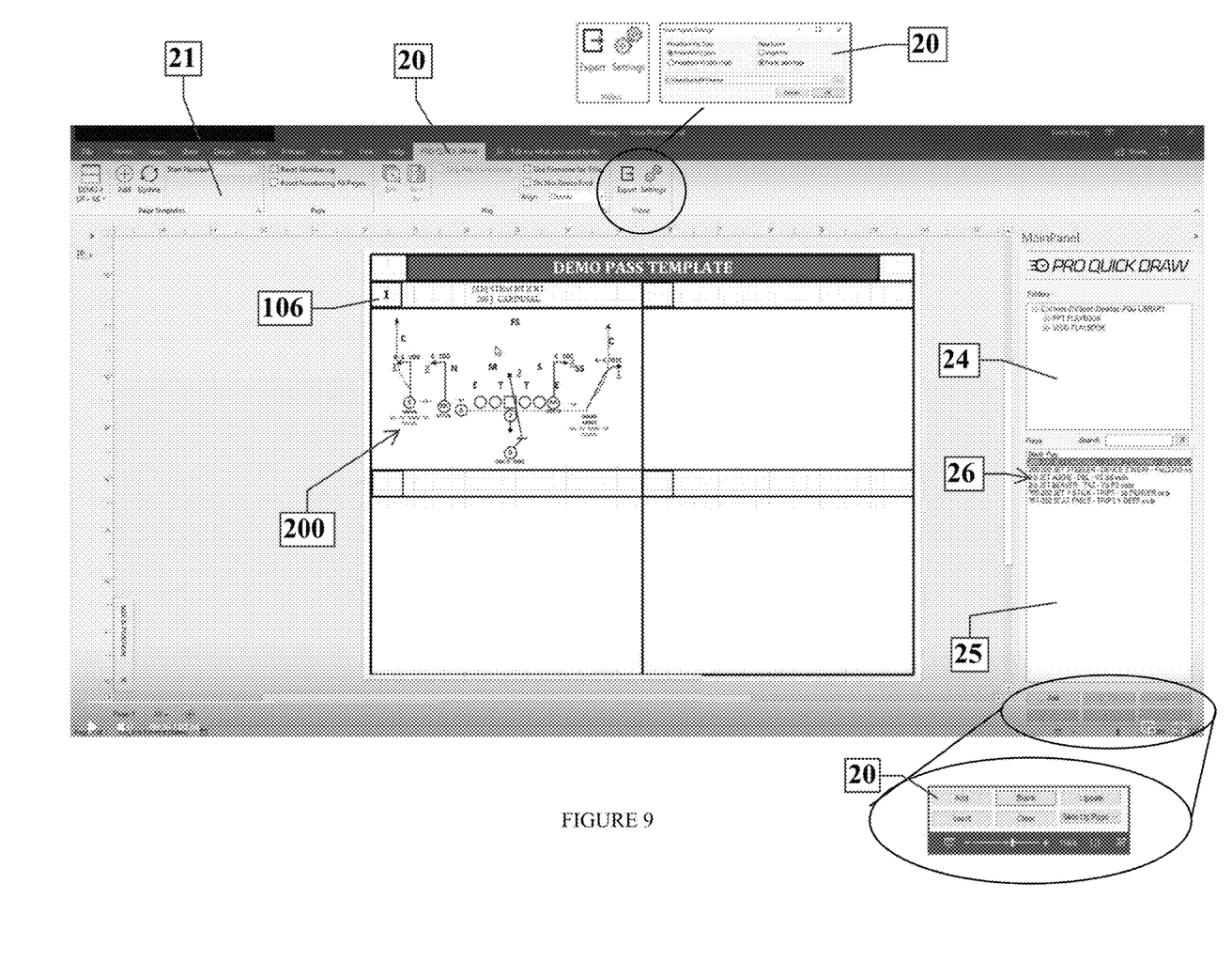
FIG. 9 is an illustration of the graphic user interface screen display of FIG. 8, with a play diagram and title inserted into and displayed in a first tile of the page layout template.
Figure 10:
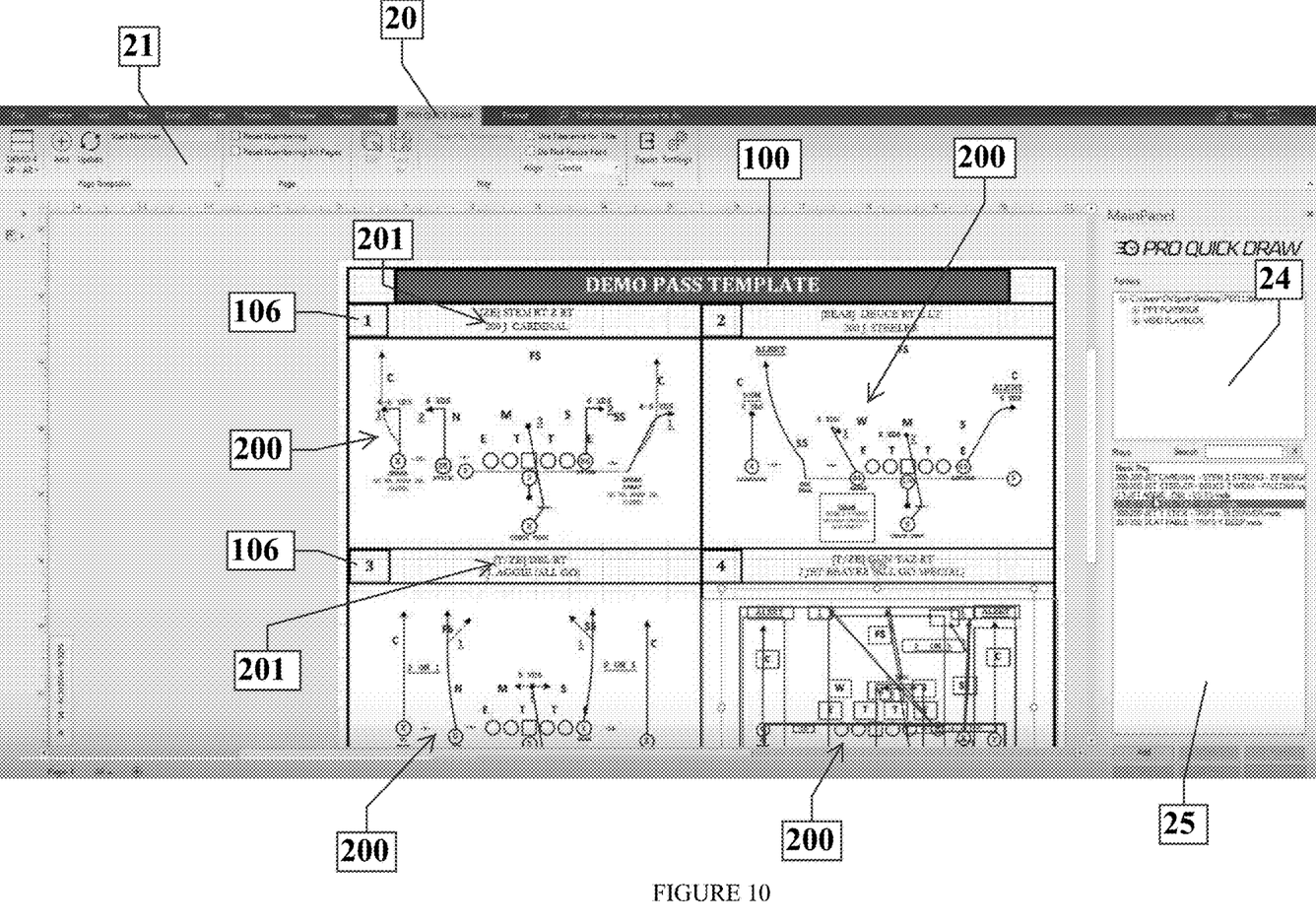
FIG. 10 is an illustration of the graphic user interface screen display of FIG. 8, with a play diagram and title inserted into and displayed in all four tiles of the page layout template.

Referring to FIGS. 8, 9 and 10, page layout templates 100 are available for application to documents assembled using the play diagram compilation tool. The page layout templates 100 may be selected from a standard set of templates 100 provided with the system and already adapted for use in PQD, or customized page layout templates 100 built to end-user specifications. Each page layout template 100 must include at least one tile 104 per page containing at least one 'Type' command as described herein.

Referring to FIG. 5, the ribbon of the PQD graphic user interface 20 includes a 'Select Template' icon. Referring to FIG. 8, selection of this icon opens a drop-down box containing various page layout templates 100 available for application to the document displayed in a visual workspace document window 15. The name 102 of each page layout template 100 may be changed by right clicking the template 100 and typing the change. Referring to FIG. 9, once a page layout template 100 is selected from the drop-down box, the template may be applied to the page of the active document displayed in the visual workspace document window 15 by selecting an 'Update' button on the PQD graphic user interface 20, or applied to a newly added subsequent page of the active document by selecting an 'Add' button on the PQD graphic user interface 20.

Referring to FIG. 9, a play diagram 200 with or without associated title 201 may be inserted into a tile 104 in the page layout template 100 applied to the active document and displayed in the visual workspace document display 15 by either double clicking the file containing the desired play diagram 200 in the 'Plays' library picklist 25, or selecting the file in the 'Plays' library picklist 25 and clicking an 'Add' button on the PQD graphical user interface 20. Under both options, the content of the selected file (i.e., a single play diagram 200) is inserted into the first available open tile 104 containing a 'Drawing' type command and the tile 104 is automatically numbered in sequence with a tile number 106. Referring to FIG. 10, a four-up (i.e., four tile) page layout template 100 has been applied to the displayed document page. Sequential selection of four play files inserts the image of the play diagram 200 content from each of the selected play files in sequence into one of the four tiles 104 in the page layout template 100, numbered sequentially 1-4. Selection of a fifth play file will automatically create and display a page 2 of the active document, apply the selected four-up page layout template 100 to the page 2, and insert an image of the play diagram 200 content of the selected fifth play file into the first available open tile 104 in page 2.

A blank or empty unnumbered tile 104 can be created in the same manner, by selecting the Blank Play file from the 'Plays' picklist 25.

Referring to FIG. 10, functionality can be provided so that each tile 104 will be automatically sequentially numbered with a tile number 106 when a play diagram 200 is inserted into the tile 104. This sequential tile numbering preferably continues on subsequent pages (i.e., six filled tiles on page 1 numbered 1-6 and six filled tiles on page 2 numbered 7-12). Functionality can be provided to allow adjustments to this automatic sequential tile numbering. Tile numbering can be restarted on a page by placing the page within the visual workspace document display 15 and checking the 'Reset Numbering' checkbox on the PQD graphic user interface 20. Unchecking this checkbox will return the page to sequential numbering from the previous page. Tile numbering can be restarted for all pages in a playbook by placing a page of the playbook within the visual workspace document display 15 and checking the 'Reset Numbering All Pages' checkbox on the PQD graphic user interface 20. Unchecking this checkbox will return all pages to sequential numbering from the previous page.

Numbering of a single tile 104 can be skipped by selecting the number displayed for the tile 104 and checking the 'Skip Play Numbering' checkbox on the PQD graphic user interface 20. The tile number 106 is removed and from that tile 104 and all subsequent tiles 104 in the sequence will be reduced by one to maintain continuous sequential numbering. Selecting the empty tile numbering space of the skipped tile number 106 and unchecking this checkbox will then add a tile number 106 to the tile and increase the tile number 106 of all subsequent tiles 104 in the sequence to maintain continuous sequential tile numbering.

Functionality can be provided to allow a play diagram 200 to be inserted between two tiles 104 which already contain an image of a play diagram 200. Referring generally to FIGS. 9 and 10, select the tile 104 where the new play diagram 200 is to be inserted, select the file containing the new play diagram 200, and click an 'Insert' button on the PQD graphic user interface 20. Subsequent tiles 104 will then automatically shift down a tile 104.

Functionality can be provided to allow a play diagram 200 to be removed or cleared from a tile 104. Referring generally to FIGS. 9 and 10, select the tile 104 to be cleared and click the 'Clear' button.

In a preferred embodiment, multiple options are made available for treatment of the removed or cleared tile 104, and shifting of remaining tiles 104 after removal or clearance of a tile 104. Referring generally to FIGS. 9 and 10, prior to clicking the 'Clear' button one of three options for reformatting the rest of the filled tiles 104 in the playbook can be presented in a drop-down box. Selection of a 'Leave' option clears the content of the tile 104, leaves the cleared tile 104 as an empty tile 104 without a tile number 106, and renumbers subsequent filled tiles 104 to reflect the empty and unnumbered tile 104, but does not shift subsequent tiles 104 up to fill the cleared tile 104. Selection of a 'Slide Up Page' option clears the content of the tile 104 and shifts subsequent tiles 104 on the page up to fill the cleared tile 104, leaving the last tile 104 on the page empty. Selection of a 'Slide Book Up' option clears the content of the tile 104 and shifts subsequent tiles 104 in the entire playbook up to fill the cleared tile 104.

Functionality can be provided to allow replacement of a play diagram 200 appearing in a tile 104 with a different play diagram 200, or allow a play diagram 200 to be placed into a tile 104 designated as blank. Referring generally to FIGS. 9 and 10, select the tile 104 containing the play diagram 200 to be replaced or the empty tile 104, select the file containing the play diagram 200 to be inserted from the 'Plays' library picklist 25, and click the 'Update' button.

Functionality can be provided to allow a play diagram 200 depicted in a tile 104 to be edited and saved over the file containing the play diagram 200 in the working library. Referring generally to FIG. 10, select a play diagram 200 in a tile 104, click an 'Edit' button on the PQD graphic user interface 20 which pulls and displays the play diagram 200 into a visual workspace document display 15 separate and apart from the visual workspace document display 15 displaying the page layout template 100 from which the play diagram 200 was selected, editing the play diagram 200 and then saving the edited play diagram 200.

Functionality is preferably provided to allow the edited play diagram 200 to be saved over the existing file in the working library by clicking a 'Save' button, or saved as a new file in the working library for display in the 'Plays' library picklist 25 by clicking a 'Save As' button. The choice is preferably offered after clicking the 'Edit' button and prior to allowing editing of the play diagram 200.

Selection of 'Save As' would request a new name for the new file, and upon entry of the new file name pull the play diagram 200 into the visual workspace document display 15 separate and apart from the visual workspace document display 15 displaying the page layout template 100 from which the play diagram 200 was selected, for editing. Saving the edited play diagram 200 then creates a new file and adds this new file to the growing 'Play' library picklist 25 containing the edited play diagram 200.

Functionality can be provided so that each tile 104 in the template includes a 'Title' type command as described herein, directing insertion of a title when a file containing a play diagram 200 is selected for insertion into the tile 104. The title to be inserted into the tile 104 can be pulled from the content of the file or alternatively pulled from the file name of the file. Referring generally to FIG. 10, the former is preferably the default setting, with the later selectable by checking a 'Use Filename for Title' check-box on the PQD graphical user interface 20. The later is particularly useful when the content of some of the files in the 'Play' library picklist 25 do not include a title box.

Functionality can be provided to allow changes in alignment of each play diagram within its image box inserted into a tile 104. Referring generally to FIG. 10, alignment of a play diagram 200 within its image box can be changed by selecting the play diagram 200 in the visual workspace document display 15, opening the 'Align' dropdown box on the PQD graphical user interface 20 and selecting the desired alignment from the available options.

Functionality can be provided to prevent resizing of text in a play diagram 200 when the diagram 200 itself is resized to fit within the 'Drawing' image box on a template into which the play diagram 200 is to be inserted. Referring generally to FIG. 10, font resizing of text in a play diagram 200 when the play diagram 200 is inserted into a tile 104 can be prevented by checking the "Do Not Resize Font' box on the PQD graphical user interface 20. This maintains any particular scaling employed when the play diagram 200 was created.

Figure 6:
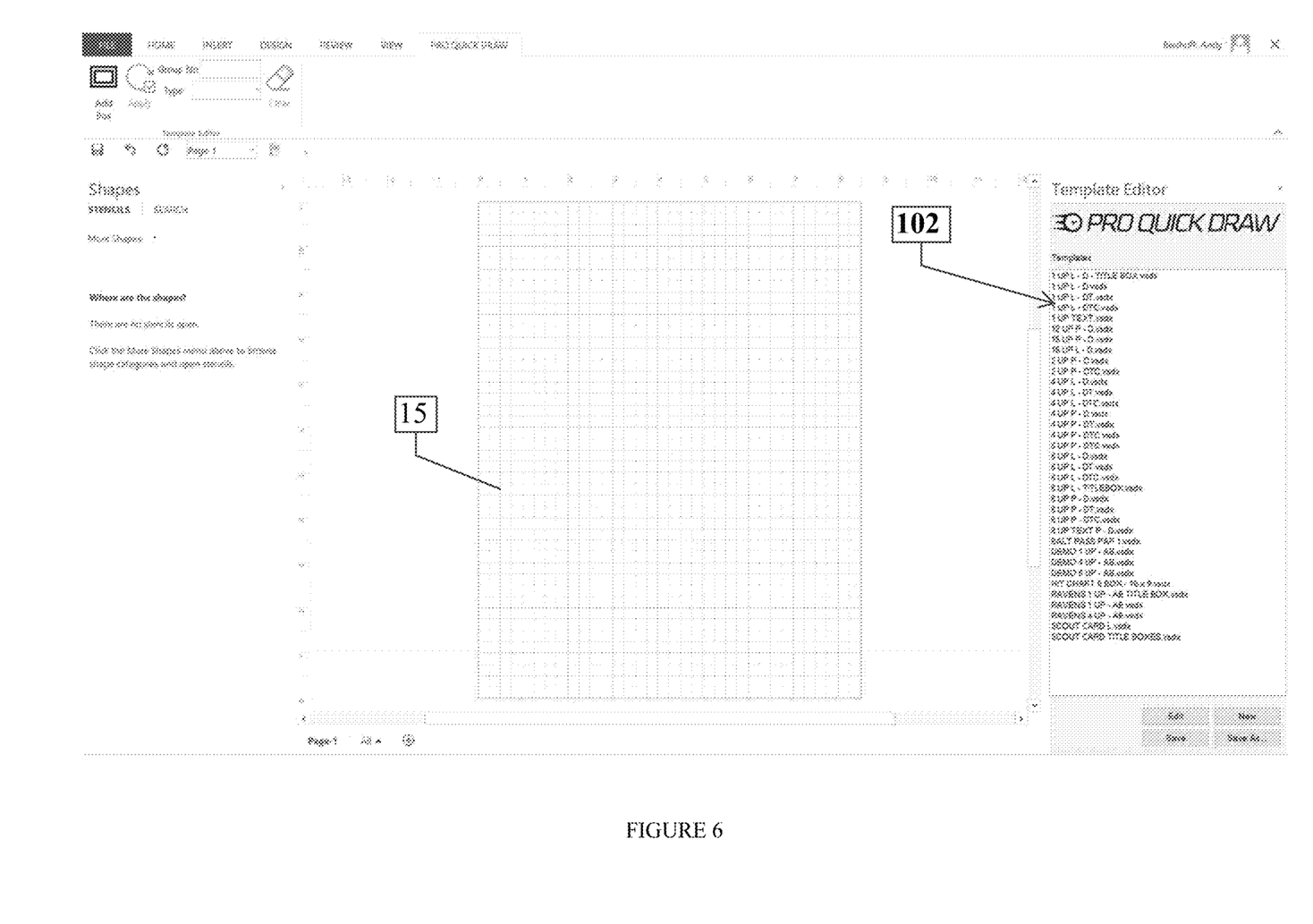
FIG. 6 is an illustration of one embodiment of a graphic user interface screen display of a template editor module of one embodiment of a play diagram compilation tool, with a display of an empty page in the visual workspace/document window.
Figure 7:
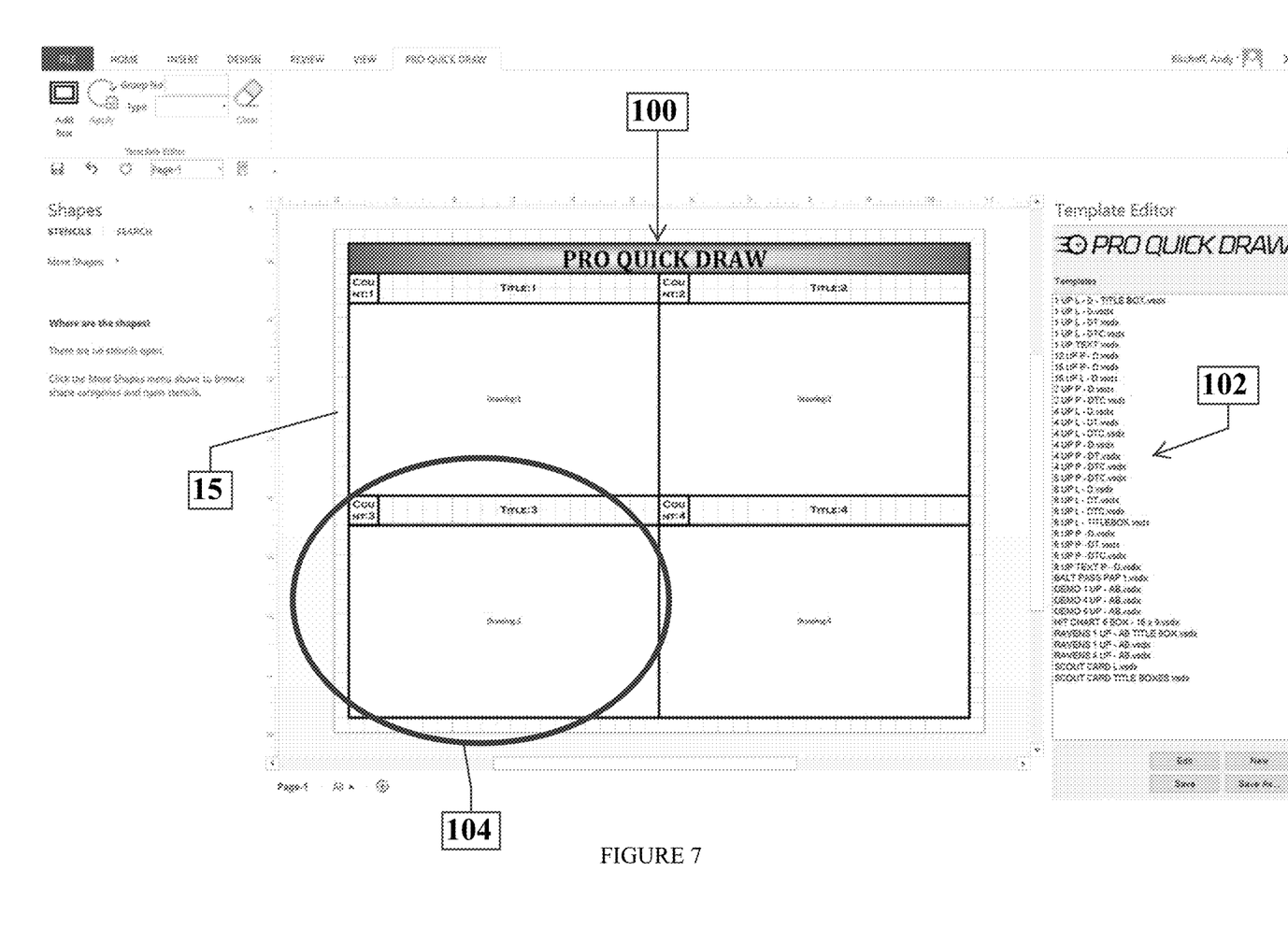
FIG. 7 is an illustration of one embodiment of a graphic user interface screen display of a play diagram compilation tool with a four-up page layout template applied to the document page displayed in the visual workspace/document window.

The system may include a template editor feature for allowing end-user creation and customization of page layout templates 100. Referring to FIG. 4, select the Template Editor icon on the PQD graphic user interface 20. Referring to FIGS. 6 and 7, this displays a Template Editor page with an empty active document in the visual workspace document display 15. Select a page layout template 100 to be edited from the list of .vsdx templates 100 in the 'Templates' library picklist appearing on the screen. The selected template 100 will be displayed as an active document in the visual workspace document display 15.

Referring generally to FIGS. 6 and 7, image boxes already in the page layout template 100 may be removed by selecting the image box and hitting delete, leaving only a Visio decorative template.

Image boxes may be added to the Visio decorative template. The image boxes are preferably sized or resized to fit within one of the visually framed cells appearing on the Visio decorative template. Referring generally to FIGS. 6 and 7, selection of the 'Add Box' button provides a repositionable and resizable image box which can be placed within the Visio decorative template appearing in the visual workspace document display 15. Place the image box within the Visio decorative template at the desired location, type in a grouping number for the image box using the 'Group No' function on the PQD graphic user interface 20, select a type ('Count', 'Title' or 'Drawing') using the 'Type' dropdown box on the PQD graphic user interface 20, and then click 'Apply" on the PQD graphic user interface 20 to apply the selected command to the image box and apply the image box to the Visio decorative template to create a functional page layout template 100 suitable for use with the integrated system described herein.

Referring generally to FIGS. 6 and 7, 'Group No' assigns a group number to an image box placed in the template. It groups together one of each type of image box (i.e., a count image box, a title image box and a drawing image box). Grouped image boxes populate together from a common play file.

Referring generally to FIGS. 6 and 7, 'Type' designates the information or image to be displayed in the image box. 'Count' places a sequential page number command into an image box. 'Title' directs insertion of a title from a play file into the image box, 'Drawing' directs insertion of a diagram from the content of a play file into the image box.

An entire multipage document created using the play diagram compilation tool, commonly referenced as a playbook, can be exported to a presentation program such as Power Point, DVSport, XOS, or Hudl, for use as content in a presentation. Referring generally to FIG. 9, clicking the 'Export' button on the PQD graphic user interface opens a dialog box requesting selection of a formatting option (e.g., .pptx or .ppt), selection of whether to save the file as a single file or individual page files, a name for the file and identification of a receiving folder for the file. Once exported, the file is now available for import as presentation content into a presentation program of choice.

EXAMPLES

Example 1 [Football Playbook]

Creating and Customizing a Template

First, select a template. Referring to FIGS. 4 and 5, there are two options.

Option 1: From Visio or Power Point, locate and select the 'Template Editor' icon on the PQD add-on tool bar. This displays a Template Editor page with a Template Editor toolbar. A menu of already created templates available for use with the play diagram compilation tool are displayed on this page. These templates are editable and can be customized and saved. Select a template.

Option 2: Find an existing document containing a Visio or Power Point template. Remove any drawings from the document and save the document as a new single page Visio or Power Point file. Open the new file which will bring you into Visio or Power Point and display the template. Locate and select the Template Editor icon on the PQD add-on tool bar. This displays a Template Editor page with a Template Editor toolbar and a display of the template.

Referring to FIGS. 6 and 7, select the 'Add Box' button. This provides a repositionable and resizable image box which can be placed within the Visio template. Place the image box within the Visio template, type in a grouping number and select a type ('Count', 'Title' or 'Drawing') using the 'Group No' and 'Type' functions on the ribbon, and click apply to apply the selected functions to the image box and the image box to the template.

'Add Box' Button

Referring to FIGS. 6 and 7, selection of the 'Add Box' button provides a rectangular shaped image box that is moveable and adjustable in size and structure for placement in the template.

'Group No' Button

Referring to FIGS. 6 and 7, Group No is short for group number. A group number must be associated with each image box placed in the template and groups together one of each image box type. A first count image box, title image box and drawing image box placed in the template would be Group No 1, meaning these image boxes populate together from a common play file. The Group No command should be attached to every image box on the template.

'Type' Drop Down Menu

Conn/Command

Places a sequential page number command into an image box.

Title Command

Places a title command into an image box for directing insertion of a title from a play file into the image box.

Drawing Command

Places a drawing command into an image box for directing insertion of a diagram from the content of a play file into the image box.

'Apply' Button

Applies the selected group number and command to the image box and the image box to the template.

Importing Files Containing Individual Play Diagrams to Create a Working Library Referring generally to FIG. 5, clicking the small dialogue launcher under the 'Align' drop down box opens a window for selection of files. Files containing individual play diagrams can be imported from any location, including a network drive. Select a folder containing at least one file containing an individual play diagram and press 'OK'. The folder will appear in the box entitled 'Folders'. Clicking on the folder in the "Folders' box will populate the box entitled 'Plays' with the files contained within the selected folder.

Applying a Template

Referring to FIGS. 5, 8 and 9, click 'Select Template' on the toolbar and select a template from the templates shown. Next, make a choice between selecting 'Add' or 'Update'. Selecting 'Add' creates a new page in the document open in the diagram compilation tool with the selected template, leaving the templates on other pages in the open document. Selecting 'Update' clears the page currently displayed in the document window of the diagram compilation tool and starts with a fresh layout for that page with the template you selected.

Searching Diagrams

Referring to FIGS. 9 and 10, play diagrams can be located by typing a word or word string found anywhere in the name of a file into the Search Bar just above the "Plays' box. Files containing the searched word or word string will be displayed in the 'Plays' library display box.

Adding Diagrams to Document

Referring to FIGS. 9 and 10, there are two options for adding diagrams to a document open in the document window of the play diagram compilation tool. Option 1 is to double-click on a file listed in the 'Plays' library box. Option 2 is to select your play from the 'Plays' box and click the 'Add' button. Both options insert and display the diagrammatic content of the selected file into the first empty box in the template containing a drawing command.

Reset and Skip Numbering

Referring to FIG. 10, boxes within a document containing a page number command are sequentially numbered. Numbering can reset for the page of a document currently displayed in the document window of the play diagram compilation tool by checking the 'Reset Numbering' check-box on the toolbar of the play diagram compilation tool. Numbering on that page will restart and continue on following pages without affecting previous pages. Numbering can reset for every page of a document currently open in the document window of the play diagram compilation tool by checking the 'Reset Numbering All Pages' check-box' on the toolbar of the play diagram compilation tool. The starting number for the sequence of page numbers on the page of a document currently displayed in the document window of the play diagram compilation tool can be changed by typing in the desired starting number in the 'Start Number' box on the toolbar of the play diagram compilation tool.

Numbering can be skipped for a box with a page number command by selecting the box and then checking the 'Skip Play Numbering' check-box on the toolbar of the play diagram compilation tool. This will eliminate number of that box only and apply the number that would have been assigned to that box to the next box with a page numbering command.

Blank Box Set

A box set (i.e., boxes grouped together with Group Number such as a box with a page number command, a box with a title command and a box with a drawing command) can be skipped and remain empty by inserting the Blank Play file from the 'Plays' listing into a box with a drawing command. The box set will remain empty without a number, and will allow the number sequence to flow sequentially thereafter.

Insert Play

Referring generally to FIGS. 9 and 10, a play from the 'Plays' listing may be inserted between boxes already containing play diagrams by selecting the box in the displayed document page which should follow the inserted play, selecting the play to be inserted from the 'Plays' listing, and then clicking the 'Insert' button at the lower righthand corner of the graphical user interface of the play diagram compilation tool. The selected play is inserted and all succeeding boxes containing a play are bumped one box in the document.

Remove Play

Referring generally to FIGS. 9 and 10, a play is removed from a document by selecting the play in the document display window of the play diagram compilation tool, clicking the 'Clear' button in the lower right corner of the graphical user interface of the play diagram compilation tool and clicking on one of three options from a drop down menu, 'Leave' clears the selected play and leaves the rest of the document unchanged with a blank box, 'Slide Up Page' clears the selected play and reformats only that page of the document leaving a blank box at the end of the page, 'Slide Up Book' clears the selected play and reformats all pages of the document.

Replace Play

Referring generally to FIGS. 9 and 10, a box containing a play or designated as a blank box can be replaced with a new play by selecting the box to be updated in the document display window of the play diagram compilation tool, selecting the new play to be inserted from the 'Plays' listing, and then clicking the 'Update' button at the lower righthand corner of the graphical user interface of the play diagram compilation tool. The existing play or designation as a blank box is deleted and replaced with the new play.

Alignment of Play Diagram

Alignment of a play diagram within a template box can be changed by selecting the play diagram box in the document window of the play diagram compilation tool, opening the 'Align' dropdown box on the toolbar of the play diagram compilation tool and selecting the desired alignment from the available options.

Title Default Setting

The filename of the files in the 'Play' listing can be designated for use as the name of the play to be displayed in the template boxes upon insertion of plays into the template by checking the 'Use Filename for Title' box on the toolbar of the play diagram compilation tool.

Font Size Retention

Font resizing of text in a play diagram can be prevented whenever the diagrammatic content is resized to fit within a box in the template by checking the "Do Not Resize Font' box on the toolbar of the play diagram compilation tool.

Editing a Play Diagram

A play diagram inserted and displayed in a template can be edited and saved over the original file in the 'Play' listing by selecting a play diagram to be edited in the document window of the play diagram compilation tool, clicking 'Edit' button on the toolbar of the play diagram compilation tool which pulls the play diagram into a diagram edit subprogram, editing the play diagram and then saving the edited play diagram.

A play diagram inserted and displayed in a template can be edited and saved as a new file in the 'Play' listing by selecting a play diagram to be edited in the document window of the play diagram compilation tool, clicking the 'Save As' button on the toolbar of the play diagram compilation tool which requests a new name for the file, and upon entry of the new file name pulls up a the play diagram into a diagram edit subprogram for editing and saving under the new file name.

Exporting of Playbook

An entire multipage document created in the play diagram compilation tool, commonly referenced as a playbook, can be exported to a presentation program such as Power Point, DVSport, XOS, or Hudl, for use as content in a by clicking the 'Export' button on the toolbar of the play diagram compilation tool, selecting pptx or ppt as the formatting option, selecting to save as a single file or individual page files, naming the file and selecting a receiving folder. The file is now available for import as presentation content into a presentation program of choice.

I claim:

1. A method comprising:
   (a) creating, through a user inteface, a first page layout template comprising a plurality of box sets, wherein each of the plurality of box sets is grouped together through group numbers, by:
      i) creating a first box set by:
         (1) receiving a request to add a first box, displaying the first box in the user interface, receiving a selection of a first type for the first box, and associating the first box with a first group number,
         (2) receiving a request to add a second box, displaying the second box in the user interface, receiving a selection of a second type for the second box, and associating the second box with the first group number, and
         (3) receiving a request to add a third box, displaying the third box in the user interface, receiving a selection of a third type for the third box, and associating the third box with the first group number, and
      (ii) creating a second box set by:
         (1) receiving a request to add a fourth box, displaying the fourth box in the user interface, receiving a selection of the first type for the fourth box, and associating the fourth box with a second group number,
         (2) receiving a request to add a fifth box, displaying the fifth box in the user interface, receiving a selection of the second type for the fifth box, and associating the fifth box with the second group number, and
         (3) receiving a request to add a sixth box, displaying the sixth box in the user interface, receiving a selection of the third type for the sixth box, and associating the sixth box with the second group number,
   (b) creating an active document having a page based upon the first page layout template, wherein the page contains the plurality of box sets defined by the group numbers in the first page layout template;
   (c) selecting a plurality of selected electronic files;

(d) inserting content from a selected one of the plurality of selected electronic files into an assigned box set in the active document by:
  (i) identifying a title based on the selected electronic file,
  (ii) inserting the identified title into the box of the first type for the assigned box set,
  (iii) identifying visual content in the selected electronic file,
  (iv) inserting the identified visual content into the box of the second type for the assigned box set, and
  (v) inserting a count value into the box of the thrid type for the assigned box set; and
(e) repeating step (d) to insert the content of each selected electronic file into a different box set in the active document.

2. The method of claim 1 wherein a file name of the selected electronic file is inserted into the box of the first type.

3. The method of claim 1 further comprising a second page layout template comprising a second set of box sets having different sizes than the plurality of box sets of the first page layout template, wherein the second page layout template defines a layout of box sets for the second page of the active document, wherein the visual content of the electronic files inserted into boxes of the second type on the second page is automatically resized to fit.

4. The method of claim 1 wherein the first page layout template further comprises a third box set and a fourth box set, wherein each of the box sets are arranged in a two-by-two grid.

5. The method of claim 1 wherein the count valves are automatically sequentially numbered.

6. The method of claim 1 further comprising exporting the active document to a presentation program for use as content in a presentation.

7. A method comprising:
a) creating, through a user inteface, a page layout template comprising a plurality of box sets, wherein each of the plurality of box sets is grouped together through group numbers, by:
  i) creating a first box set by:
    (1) receiving a request to add a first box, displaying the first box in the user interface, receiving a selection of a first type for the first box, and associating the first box with a first group number, and
    (2) receiving a request to add a second box to the page layout template, displaying the second box in the user interface, receiving a selection of a second type for the second box, and associating the second box with the frist group number,
  ii) creating a second box sety by:
    (1) receiving a request to add a third box, displaying the third box in the user interface, receiving a selection of the first type for the third box, and associating the third box with a second group number, and
    (2) receiving a request to add a fourth box, displaying the fourth box in the user interface, receiving a selection of the first type for the fourth box, and associating the fourth box with the second group number,
b) creating an active document having an active page based upon the page layout template, wherein the active page contains the first box set associated with the first group number and the second box set associated with the second group number;
c) receiving a selection of a first electronic file;
d) inserting content from the first electronic file into the first box set on the active page by extracting first content and second content from the first electronic file and inserting the first content into the box of the first type associated with the first group number and inserting the second content into the box of the second type associated with the first group number;
e) receiving a selection of a second electronic file; and
f) inserting content from the second electronic file into the second box set on the active page by extracting third content and fourth content from the second electronic file and inserting the third content into the box of the first type associated with the second group number and inserting the fourth content into the box of the second type associated with the second group number.

8. The method of claim 7, wherein the first type comprises a title.

9. The method of claim 8, wherein the first content from the first electronic file is a file name of the first electronic file.

10. The method of claim 9, wherein the third content from the second electronic file is a title found in the content of the second electronic file.

11. The method of claim 10, wherein the second type is visual content, further wherein the title is removed from visual content in the second electronic file thereby leaving remaining visual content, further wherein the fourth content is the remaining visual content.

12. A method comprising:
a) creating, through a user interface, a first template page comprising a first set of tiles, wherein:
  i) each tile in the first set of tiles is created by adding a plurality of boxes for each tile,
  ii) each box of the plurality of boxes is added by:
    (1) receiving an add request to add each box to the user interface,
    (2) receiving a type selection to assign a type to each box, and
    (3) assigning to each box a unique group number for that tile;
b) creating a first page in an active document based on the first template page, the first page having the first set of tiles with the plurality of boxes for each tile; and
c) adding first file content to a first tile on the first page by:
  i) selecting a first electronic file, and
  ii) extracting the first file content of different types from the first electronic file and inserting the first file content of a correct type into the plurality of boxes for the first tile.

13. The methof of claim 12, further comprising:
d) adding second file content to a second tile on the first page by:
  i) selecting a second electronic file, and
  ii) extracting the second file content of different types from the second electronic file and inserting the second file content of a correct type into the plurality of boxes for the second tile.

14. The methof of claim 13, further comprising:
e) creating, through the user interface, a second templage page comprising a second set of tiles, wherein each tile in the second set of tiles is created in a same manner as each tile in the first set of tiles; wherein the first set of tiles are arranged in a different grive arrangement than the second set of tiles.

15. The method of claim 14, further comprising:
f) creating a second page in the active document based on the second template page, the second page having the second set of tiles.

16. The method of claim 15, wherein the first set of tiles is arranged in a two-by-two grid.

17. The method of claim 14, further comprising:
g) receiving a request to update the first page to the second template page and rearranging the content on the first page to reflect the different grid arrangement of the second set of tiles.

18. The method of claim 13, further comprising:
e) receiving a request to insert content from a third electronic file between the first tile on the first page and the second tile on the first page;
f) moving the content in the second tile to a third tile on the first page; and
g) inserting content extracted from the third electronic file into the second tile.

\* \* \* \* \*